United States Patent [19]
Eckert

[11] 4,438,871
[45] Mar. 27, 1984

[54] DISPENSER
[75] Inventor: Josef Eckert, Mellrichstadt, Fed. Rep. of Germany
[73] Assignee: Wischerath and Schreiner KG, Mellrichstadt, Fed. Rep. of Germany
[21] Appl. No.: 382,094
[22] Filed: May 26, 1982
[30] Foreign Application Priority Data
  May 27, 1981 [DE] Fed. Rep. of Germany ....... 3121075
[51] Int. Cl.³ ............................................. B67D 5/52
[52] U.S. Cl. .................................... 222/137; 222/153; 222/255; 222/256; 222/326; 222/380; 222/494
[58] Field of Search ............... 222/129, 135, 136, 137, 222/153, 145, 252, 254, 255, 256, 251, 325, 326, 372, 380, 386, 387, 409; 239/304, 321, 322

[56] References Cited
U.S. PATENT DOCUMENTS
3,760,986 9/1973 Castner et al. ....................... 222/383
3,993,224 11/1976 Harrison ............................. 222/145
4,355,739 10/1982 Vierkötter ........................... 222/136

Primary Examiner—Joseph J. Rolla
Assistant Examiner—Charles C. Compton
Attorney, Agent, or Firm—Cantor and Lessler

[57] ABSTRACT

A dispenser for pasty substances and/or liquids has two coaxially arranged metering pistons 11,24 which supply charges of material from two coaxially arranged pump chambers 14,23 through ejection channels 19,26 into an ejection chamber 20. The material can emerge from ejection chamber 20 through an outlet 4. This outlet 4 is controlled by means of plug 21 biassed in closing direction. When the metering pistons 11,24 are on their suction strokes material passes from the supply tanks 17,27 which are likewise arranged coaxially one inside the other. Such a configuration yields a dispenser which consists in essence of two separate dispensers, one inside the other. The two streams of material combine directly ahead of the outlet 4.

10 Claims, 4 Drawing Figures

DISPENSER

This invention relates to a dispenser for pasty substances and/or liquids. Such dispensers have a supply tank with an axially moveable follower piston and a plunger expulsion device with a metering piston which can be reciprocated in a pump chamber. The pump chamber is connected on one side with the supply tank and on the other to an outlet for the dispenser which incorporates a plug spring biassed in the closing direction. Such a dispenser is described in DE-OS No. 29 16 206.

Known dispensers of this type have proven to be particularly effective for use with pasty substances such as toothpastes. Because of its relatively simple design it is cheap to produce, reliable in operation, and permits very precise metering of the material ejected from the supply tank, since the quantity ejected is always proportional to the distance through which the plunger is moved. It is also advantageous that in such dispeners the supply tank is not pressurized when in use, and that the viscosity of the charge is not therefore altered as a result of such pressure.

Recently, increasing use is being made of two component materials which are activated only after the two components have been combined. The most familiar of such substances are two component adhesives, but there are many plastics which are harden only after the addition of a second component and also cosmetics to which an activator has to be added immediately before use for them to become effective.

This disclosure undertakes the task of reconfiguring the known dispenser in such a way that it can be used as a dispenser for two component materials without the loss of any of its advantages.

When the button for the plunger of the dispenser here disclosed is depressed, two coaxial metering pistons are operated simultaneously and charges of material are delivered from the two pump chambers simultaneously in quantities dependent upon the cross-section of the respective pistons. The ratio of the quantities of the two charges of materials expelled simultaneously is constant, so that, regardless of the quantities discharged from the dispenser, for example, for cosmetics, the proper quantity of activator and for adhesives the proper quantity of hardener, is added. The dispenser can also be used for products of different colours, e.g., red and white toothpaste, so that such material expelled can, for instance, be white with red stripes.

In the new dispensers it is possible to use a single outlet with a single plug to close off both of the supply tanks so that volatiles do not escape from the material. In addition, the two masses of material are first combined immediately ahead of the outlet so the danger of dispenser blockage is minimized. An alternative is to open the ejection channels directly to the exterior so that there is no internal mixing. This eliminates completely the danger that the dispenser may become blocked as a result of the combination and reaction of the two materials.

It is also advantageous if the second supply tank is configured as a separate unit which can be inserted into the first supply tank. Thus the second supply tank can be dimensioned in accordance with charge quantities required.

In a further advantageous configuration the second supply tank can be provided with one way flap valve. This ensures that the second supply tank is not pressurized when the second metering piston completes its working stroke. This would be disadvantageous for many materials. The arrangement of the flap valve directly on the supply tank is advantageous from the production point of view. The flap valve also prevents back flow of material from the second pump chamber into the second supply tank.

The second pump chamber can also have a one way flap valve which opens in the direction of the ejection channel. This valve is, however, only necessary if the ejection channel leads to a separate external discharge opening so that, when the second metering piston completes its suction stroke, air is not drawn into its ejection channel and thence to the second pump chamber. If the ejection channel opens out into a common ejection chamber the plug there located will prevent any air being drawn through the ejection opening.

If the plug is biased in the direction of the closure, by means involving an integral spherical section, instead of with a separate spring, costs are reduced. This configuration is of particular significance, if the plunger is not arranged in axial alignment with the plug so that it is not possible for the pressure of the plunger spring to act on the plug. The configuration of the plug with a spherical section thus simplifies assembly.

In order to achieve a lower biassing force on the plug than is possible with a precise spherical section, the section can be curved or domed. Such curvature simplifies the matching of the biassing force to the material used in each particular instance.

A bail structure is also described as an original seal structure to indicate that the device has not been used. As long as the bail is in place above the button the dispenser cannot be used. The existence of the bail indicates that the dispenser is unused and is thus full. The bail also can prevent any of the material being ejected from the dispenser in the unfortunate event that it should be subjected to force on the dispenser button when it is in a bulk container. This type of original seal is cheaper than the conventional external cap placed over the inside cap and wired or taped into position.

A simple and effective child safety device for the dispenser can also be achieved. In order to use the dispenser, one hand must compress the dispenser button in a radial direction, while the other hand depresses the button down towards the dispenser head. This configuration does not require that the button be round, as found in child safety devices which function by rotation and pressure. The operation of the new structure is sufficiently complex to preclude unintended use by small children.

The inner portion of the dispenser can also be used as a simple dispenser for a single material.

More particularly in accordance with the invention there is provided, a dispenser for pasty substances and/or liquids having a supply tank with an axially displaceable follower and an ejection device with an operating plunger, comprising a reciprocable metering piston in a pump chamber, the pump chamber is connected on the one side to the supply tank and on the other to an outlet for the dispenser, a plug in said outlet biased in the direction of closure, further characterized in that a second pump chamber 23 of small diameter than the first pump chamber 14, and having a second metering piston 24 is mounted coaxially of the first pump chamber, the second metering piston being connected to the plunger 3 and the second pump chamber 23 being connected to a second supply tank 27 within a first supply tank 17 and ejection channel means for meterial from said second pump chamber. The ejection channel may open into a ejection chamber ahead of the outlet or may open directly to the outside of the dispenser.

Specific embodiments of the invention will now be described having reference to the accompanying drawings in which.

Figure 1:
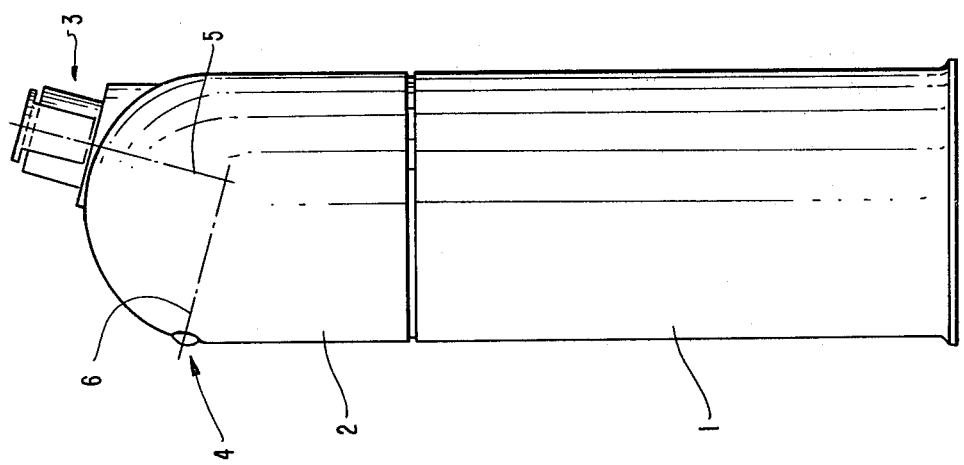
FIG. 1 is a side view of a dispenser embodying the invention.

The dispenser illustrated in FIG. 1 comprises a lower portion 1 and a head 2, with a plunger 3 and an outlet 4. The plunger 3 and the outlet 4 are oriented so that their axes 5, 6 intersect at right angles and the axis 6 is inclined somewhat to the horizontal. Detailed construction of the dispenser can be seen in FIG. 2. The plunger 3 has a button 7 which can be depressed against the force of a coil spring 8. Spring 8 rests on one side adjacent the inside of the button 7, and on the other on an end cap 9 connected rigidly to the head 2.

The button 7 is provided with a piston rod 10 of cruciform cross-section in the interior of the head 2, and is connected rigidly to a first metering piston 11. The piston 11 carries seal 13 in a suction chamber 12 and a seal 15 in a first pump chamber 14. The seal 15 is configured so that it closes on the working stroke of the metering piston; however, during the suction stroke the charge of material is permitted to pass through into the first pump chamber between the metering piston 11 and the seal 15. This type of arrangement has been described in Patent Application P 31 12 963.3, of the Federal Republic of Germany.

The suction chamber 12 and the first pump chamber 14 are connected through a truncated conical area 16 of the lower portion 1 to the first supply tank 17 in the lower portion 1. In the first supply tank 17 is a follower piston 18 so configured that when there is partial vacuum in the first supply tank 17 it can move into the tank. When there is an over-pressure reverse movement is prevented.

A first ejection channel 19 passes from the first pump chamber 14 into an ejection chamber 20. Material can flow to the exterior from this through the outlet 4 by way of plug 21.

Plug 21 has a spherical section 22 at its end away from the outlet 4. This can be of an exact spherical shape as shown at the right hand end in FIG. 2 or it can be simply curved or domed, as illustrated for the upper portion of the stopper 21. The plug 21, including its spherical section 22 is of resilient material and is under stress against the solid housing components of the dispenser so that the plug 21 is biassed in the closure direction. In the presence of material under pressure in ejection chamber 20 the plug moves to the right in the figure by partial collapse of the spherical section and outlet 4 is opened.

Coaxially and within the first pump chamber 14 is a second pump chamber 23. This contains a second metering piston 24 connected rigidly by means of a second piston rod 25 to the first metering piston. From the second pump chamber 23 material can pass through a second ejection channel 26 into the ejection chamber 20 immediately ahead of the outlet 4. Material is drawn into the second pump chamber 23 from second supply tank 27 arranged coaxially to and within the first supply tank 17. Chamber 23 has a follower piston 28 which, like the piston 18 in the first supply tank 17, can only move into the interior of the second supply tank 27, but not in the reverse direction.

The second supply tank 27 is connected through a one-way flap valve 29' which opens into the second pump chamber 23. A second flap valve 29" can be provided between the second pump chamber 23 opening into the second ejection channel 26. Such a flap valve 29" prevents back flow of material from the second ejection channel 26 during the suction stroke of the second metering piston 24. This danger does not exist in the particular embodiment illustrated in FIG. 2 since the plug 21 is closed during the suction stroke. If the second ejection channel 26 does not however open into the ejection chamber 20, but opens to the outside of head 2 ahead of the outlet 4 and does not have its own plug, then flap valve 29" must be provided. Such a configuration would be useful, for example, in a dispenser for a two component adhesive, where the two components are not to combine inside the dispenser and thus lead to danger of blocking the dispenser.

Figure 3:
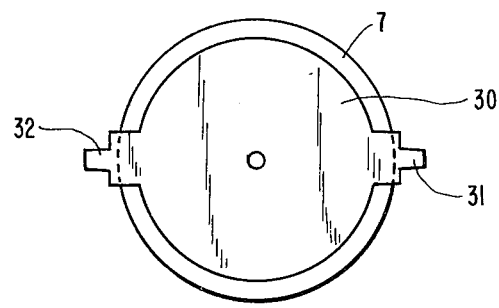
FIG. 3 is a plan view of the plunger used in the dispenser of FIGS. 1 and 2.
Figure 4:
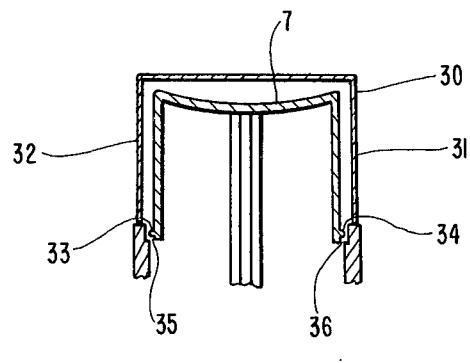
FIG. 4 is a side cross-section through the dispenser in the area of the plunger.

Two additional details can best be seen by referring to FIGS. 3 and 4. A bail or protective clip 30 is passed over the button 7, and is secured to the upper portion of the head 2 by means of the two arms 31 and 32, in such a manner that it can be easily broken off. The bail 30 overlies the upper surface of the button 7 and, essentially prevents the button 7 being depressed unless the bail 30 is broken. Thus the bail 30 provides an indication that the dispenser is new, and is being used for the first time.

FIG. 4 shows a child safety device used for the button 7. Two detent stops 33,34 are provided on button 7 and normally rest in the detents 35, 36 on head 2. When button 7 is compressed radially in the area of the detent stops 33 and 34, they move out of the detents 35 and 36. The other hand can then be used to depress the button 7. The detent stops can alternatively be provided on the head 2 and the detents on the button 7.

The dispenser described herein operates as follows. For first use the bail 30 is broken off. One hand is then used to compress the button 7 radially so that the detent stops 33 and 34 are released. The other hand is subsequently depresses the button 7 into the head 2 of the dispenser, against the force of the coil spring 8. This movement displaces the metering pistons 11 and 24 simultaneously. The seal 15 is forced down on the pump chamber side face of the metering piston 11. The metering piston 11 thus delivers a charge of material from the first pump chamber 14. Simultaneously the second metering piston 24 delivers a charge of material from the second pump chamber 23. The materials move respectively into the ejection channels 19 or 27, and from there into the ejection chamber 20. In chamber 20 the entrance of the charge of material creates an over-pressure on that the plug 21 opens outlet 4 and the two materials emerge.

During this working stroke of the two metering pistons 11 and 24 the flap valve 29' is closed so that pressure does not build up in the second supply tank 27. No pressure builds up in the first supply tank 17 during the working stroke either, since the material forced from the suction chamber 12 by the sealing ring 13 moves past the seal 15 into the first pump chamber 14.

Figure 2:
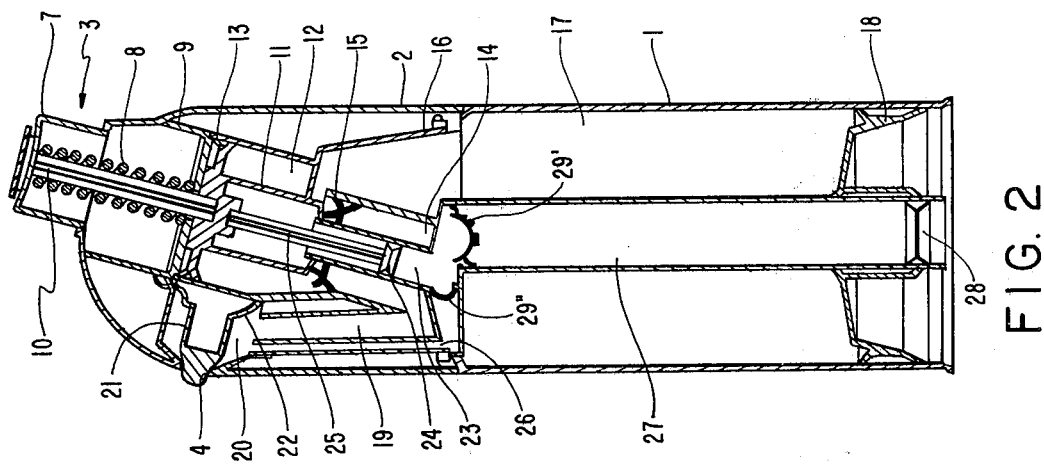
FIG. 2 is the dispenser of FIG. 1 in section, in greater detail.

When the button 7 is released the coil spring 8 forces it back into the position shown in FIG. 2. This results in the flap valve 29' opening so that material can be withdrawn from the second supply tank 27. The upward movement of sealing ring 13 draws a charge of material from the first supply tank 17. The seal 15 releases from the first metering piston 11 so that material can move past the seal 15 into the first pump chamber 14 for delivery during the next stroke in the direction of the opening 4. The withdrawal of material from the supply tanks 17 and 27 is accompanied by movement of the respective follower pistons 18 and 28 upwards (in the sense illustrated in FIG. 2) so that there is no partial vacuum developed in the supply tanks.

The embodiments of the invention in which an exclusive property or privilege is claimed are defined as follows:

1. A dispenser for pasty substances and/or liquids having a supply tank with an axially displaceable follower piston and an ejection device with an operating plunger, comprising a reciprocable metering piston in a pump chamber, the pump chamber being connected on one side to the supply tank and on the other to an outlet for the dispenser, a plug in said outlet biassed in the direction of closure, and further characterized in that a second pump chamber 23 of smaller diameter than the first pump chamber 14, and having a second metering piston 24 is mounted coaxially of the first pump chamber, the second metering piston being connected to the plunger 3 and the second pump chamber 23 being connected to a second supply tank 27 within the first supply tank 17, and ejection channel means for material from said second pump chamber.

2. A dispenser as defined in claim 1, the ejection channel 26 opening directly into an ejection chamber 20 ahead of the outlet 4.

3. A dispenser as defined in claim 1, the second supply tank 27 being configured as a separate component insertable into the first supply tank 17.

4. A dispenser as defined in claim 1, and a one way valve 29' between the second supply tank and the second pump chamber.

5. A dispenser as defined in claim 1, and a one way valve 29" between the second pump chamber and the ejection channel 26.

6. A dispenser as defined in claim 1, the plug 21 being biassed by means of a curved resilient section, resting on housing components within the dispenser on its side away from the opening 4.

7. A dispenser as defined in claim 6, the curved section 22 being spherical.

8. A dispenser as defined in claim 1, the dispenser including a housing and the plunger 3 having a button 7 moveable partially into the housing for operation of the dispenser, and a break-off bail 30 covering said button, arms 31,32 of said bail being breakably secured to said housing.

9. A dispenser as defined in claim 1, the dispenser including a housing and the plunger 3 having a button moveable partially into said housing for operation of the dispenser, the button 7 in its rest position engaging with radially oriented detent stops 33,34 in detents 35,36 in the housing, the button 7 being sufficiently resilient for disengagement of the detents by radial compression of the button 7.

10. A dispenser as defined in claim 1, 4 or 5, the ejection channel opening exteriorly of the dispenser.

* * * * *